(12) United States Patent
Shae et al.

(10) Patent No.: US 9,219,884 B2
(45) Date of Patent: Dec. 22, 2015

(54) PERIODIC BROADCAST AND LOCATION OF EVOLVING MEDIA CONTENT WITH APPLICATION TO SEMINAR AND STROKE MEDIA

(75) Inventors: Zon-Yin Shae, South Salem, NY (US); Belle L. Tseng, Forest Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 1459 days.

(21) Appl. No.: 11/875,567

(22) Filed: Oct. 19, 2007

(65) Prior Publication Data

US 2008/0040746 A1 Feb. 14, 2008

Related U.S. Application Data

(63) Continuation of application No. 09/881,323, filed on Jun. 14, 2001, now Pat. No. 7,305,011.

(51) Int. Cl.
| | |
|---|---|
| *H04J 1/00* | (2006.01) |
| *H04N 7/173* | (2011.01) |
| *H04N 19/30* | (2014.01) |

(52) U.S. Cl.
CPC ............ *H04N 7/17318* (2013.01); *H04N 19/30* (2014.11)

(58) Field of Classification Search
USPC .......... 370/487, 464; 725/28, 29–31; 382/161
See application file for complete search history.

(56) References Cited

U.S. PATENT DOCUMENTS

| | | | |
|---|---|---|---|
| 4,261,018 A | 4/1981 | Knowlton | 358/470 |
| 4,698,689 A | 10/1987 | Tzou | 358/433 |
| 5,477,272 A | 12/1995 | Zhang | 375/240.06 |
| 5,559,808 A | 9/1996 | Kostreski et al. | 370/517 |
| 5,617,541 A | 4/1997 | Albanese et al. | 709/207 |
| 5,617,565 A | 4/1997 | Augenbraun et al. | 707/4 |
| 5,691,995 A | 11/1997 | Ikeda et al. | 371/43 |
| 5,790,935 A | 8/1998 | Payton | 725/91 |
| 5,797,001 A | 8/1998 | Augenbraun et al. | 707/9 |
| 5,822,324 A | 10/1998 | Kostresti et al. | 370/487 |
| 5,832,120 A | 11/1998 | Prabhakar et al. | 382/233 |
| 5,857,181 A | 1/1999 | Augenbraun et al. | 707/2 |
| 5,928,331 A | 7/1999 | Bushmitch | 709/231 |
| 5,940,391 A | 8/1999 | Malkin et al. | 370/390 |
| 5,973,685 A | 10/1999 | Schaffa et al. | 345/722 |
| 5,978,855 A | 11/1999 | Metz et al. | 709/249 |
| 5,983,005 A | 11/1999 | Monteiro et al. | 709/231 |

(Continued)

*Primary Examiner* — Phuc Tran
(74) *Attorney, Agent, or Firm* — Ryan, Mason & Lewis, LLP

(57) ABSTRACT

Techniques are provided for broadcasting history or coarse representations or both of stroke media and other media. Levels are created for media, and the levels are periodically broadcast. The levels segment the media and allow the media to be examined with details that range from coarse to fine or examined with varying importance or both. The periodic broadcast of the levels provides history of the media. In particular, for stroke data, levels of detail are determined through a certain method. Each level of detail is periodically broadcast. The levels of detail may be shown by themselves or combined at a receiver to create segmented views of the stroke data. A user can select a coarse view of the stroke data to quickly see the stroke history. Additionally, techniques are provided for quickly and repeatedly accessing data elements in already existing data structures. Generally, a description is created that describes data elements in a preexisting data structure. One or more links are created, from the description, which allow a user to directly access particular data elements for the preexisting data structure.

24 Claims, 16 Drawing Sheets

(56) References Cited

U.S. PATENT DOCUMENTS

| | | | |
|---|---|---|---|
| 6,031,572 A | 2/2000 | Christopoulos | 375/240.1 |
| 6,094,661 A * | 7/2000 | Salomaki | |
| 6,118,827 A | 9/2000 | Wynn | 375/273 |
| 6,119,163 A * | 9/2000 | Monteiro et al. | 709/227 |
| 6,122,660 A * | 9/2000 | Baransky et al. | 709/217 |
| 6,125,211 A | 9/2000 | Lu et al. | 382/241 |
| 6,130,898 A | 10/2000 | Kostreski et al. | 370/522 |
| 6,154,463 A | 11/2000 | Aggarwal et al. | 370/408 |
| 6,618,380 B1 * | 9/2003 | Mehta et al. | 370/395.42 |
| 6,675,384 B1 * | 1/2004 | Block et al. | 725/28 |
| 6,744,915 B1 | 6/2004 | Barton et al. | 382/161 |
| 6,918,081 B1 * | 7/2005 | Jun | 715/210 |
| 2001/0051992 A1 * | 12/2001 | Yang et al. | 709/207 |
| 2002/0157103 A1 * | 10/2002 | Song et al. | 725/97 |

* cited by examiner

FIG. 8

| Level of Detail | Number of Points Size $n_i$ | Transmission Time $t_i$ | Assign Bandwidth Fraction $F_i$ | Transmission Period $T_i$ |
|---|---|---|---|---|
| 0 | 10 | 10 ms | 1/4 | 40 ms |
| 1 | 40 | 40 ms | 1/4 | 160 ms |
| 2 | 160 | 160 ms | 1/4 | 640 ms |
| 3 | 790 | 790 ms | 1/4 | about 3 sec |

FIG. 9

| Level of Detail | Number of Points Size $n_i$ | Transmission Time $t_i$ | Required Transmission Period $T_i$ | Required Bandwidth Fraction $F_i$ |
|---|---|---|---|---|
| 0 | 10 | 10 ms | 80 ms | 1/8 |
| 1 | 40 | 40 ms | 80 ms | 1/2 |
| 2 | 160 | 160 ms | $T_2$ | $F_2$ |
| 3 | 790 | 790 ms | about 6 sec | 1/8 |

```
<!-- ############################################### -->
<!-- Definition of SceneGraphMask D                  -->
<!-- ############################################### -->

<complexType name="SceneGraphMaskType">
    <complexContent>
        <extension base="mpeg7:DType">
            <sequence>
                <element name="SubGraph" ="uriReference"
                        minOccurs="1" maxOccurs="unbounded"/>
            </sequence>
        </extension>
    </complexContent>
</complexType>
```

```
<!-- ############################### -->
<!-- Definition of MediaSpaceMask D  -->
<!-- ############################### -->
<complexType name="MediaSpaceMaskType">
  <complexContent>
    <extension base="mpeg7:DType">
      <sequence>
        <element name="SubInterval" minOccurs="1" maxOccurs="unbounded">
          <complexType>
            <sequence>
              <element name="ByteOffset" type="nonNegativeInteger" minOccurs="1"/>
              <element name="Length" type="positiveInteger" minOccurs="0"/>
            </sequence>
          </complexType>
        </element>
      </sequence>
    </extension>
  </complexContent>
</complexType>
```

FIG. 14

```
<MediaSpaceMask>
  <SubInterval> <ByteOffset> 105 </ByteOffset> <Length> 34 </Length> </SubInterval>
  <SubInterval> <ByteOffset> 167 </ByteOffset> <Length> 50 </Length> </SubInterval>
</MediaSpaceMask>
```

FIG. 15

```
<!-- ############################################### -->
<!-- Definition of OrderedGroupDataSetMask D         -->
<!-- ############################################### -->
<complexType name="OrderedGroupDataSetMaskType">
    <complexContent>
        <extension base="mpeg7:DType">
            <sequence>
                <element name="Subinterval" minOccurs="1" maxOccurs="unbounded">
                    <complexType>
                        <sequence>
                            <element name="SetName" type="uriReference" minOccurs="0"/>
                            <element name="StartComponent" type="nonNegativeInteger"/>
                            <element name="StartUnit" type="nonNegativeInteger" minOccurs="0"/>
                            <element name="EndComponent" type="nonNegativeInteger"/>
                            <element name="EndUnit" type="nonNegativeInteger" minOccurs="0"/>
                        </sequence>
                    </complexType>
                </element>
            </sequence>
        </extension>
    </complexContent>
</complexType>
```

FIG. 17

```xml
<InkSegment>
    <MediaLocator>
        <MediaUri>http://www....</MediaUri>
    </MediaLocator>
    <MediaTime>
        <MediaRelTimePoint timeBase="../../MediaLocator[1]">
            PT0S
        </MediaRelTimePoint>
        <MediaDuration>PT5S</MediaDuration>
    </MediaTime>
    <InkMediaInfo>
        <InputDevice>
            <Name> PenDevice </Name>
            <PointsPerSecond> 133 </PointsPerSecond>
        </InputDevice>
        <Handeness>left</Handeness>
        <Style>mixed</Style>
    </InkMediaInfo>
    <SceneGraphMask>
        <SubGraph>http://www.../nodeId1</SubGraph>
    </SceneGraphMask>
    <OrderedGroupDataSetMask>
        <SubInterval>
            <SetName> http://www..../Setid </SetName>
            <StartComponent> 1731 </StartComponent>
            <StartUnit> 36 </StartUnit>
            <EndComponent > 1742 </EndComponent>
            <EndUnit> 47 </EndUnit>
        </SubInterval>
    </OrderedGroupDataSetMask>
    <HandWritingRecogInfo>
        <Quality> 0.6 </Quality>
        <Result>
            <Text> Ana </Text>
            <Score> 7.0 </Score>
        </Result>
        <Result>
            <Text> Ann </Text>
            <Score> 5.4 </Score>
        </Result>
    </HandWritingRecogInfo>
</InkSegment>
```

FIG. 18

PERIODIC BROADCAST AND LOCATION OF EVOLVING MEDIA CONTENT WITH APPLICATION TO SEMINAR AND STROKE MEDIA

CROSS REFERENCE TO RELATED APPLICATIONS

This application is a continuation of U.S. patent application Ser. No. 09/881,323, filed on Jun. 14, 2001 now U.S. Pat. No. 7,305,011 incorporated by reference herein.

FIELD OF THE INVENTION

The present invention relates to multimedia and, more particularly, relates to the periodic broadcast location of evolving media content with application to seminar and stroke media.

BACKGROUND OF THE INVENTION

Most media today is either static or temporal. Static media does not change with playing or viewing time, and is exemplified by images, three-dimensional objects and text. Unlike static media, temporal media changes with playing or viewing time. Examples of temporal media are audio, video and three-dimensional animation. One problem with static and temporal media is that there is no history. For example, if a person comes late to a meeting, the person will have no way to determine what previously occurred in the meeting. Similarly, in a seminar where slides are used, a person who arrives late to the seminar cannot determine what slides have been seen. While it is possible, if the meeting or seminar has been electronically saved, for the person to review the missed portions at some other time, there is no way for a person to quickly catch up on what was missed. Thus, no history and no coarse representation of the meeting are available.

One area where this has particular relevance is in the area of whiteboard collaboration. Recently, whiteboard collaboration has been specified as a standard collaboration application, and there are commercial products that have been widely installed in personal computers and that have been implemented as part of collaborative infrastructures. With the latest advance of the electronic pen and whiteboard technologies, more human-friendly whiteboard input devices have become available for capturing whiteboard strokes. Instead of traditional and awkward mouse drawing, these technologies provide freehand writing directly on physical whiteboards or pads. As such, they dramatically enhance the importance of the whiteboard in a collaborative infrastructure. In a traditional whiteboard collaboration session, strokes generated by mouse drawing events are mainly used for annotations on existing drawings. The amount of stroke data generated is therefore rather small. With the new "friendly" stroke input devices, it is expected that the strokes will not only be used for annotations, but also as the main input to generate drawings. Therefore, the amount of stroke data of a whiteboard collaboration session is increasing dramatically.

It is well known that information redundancy exists in the stroke data. Stroke data, thus, has the characteristics of large amounts of data and file size, dynamic changes of content over time, and information redundancy. These characteristics make stroke data similar to continuous media streams such as audio and video, which exhibit similar characteristics. Stroke data, like these other continuous media streams, does not contain history and cannot be quickly reviewed.

There have been many studies concerning reducing the number of points required to represent a stroke line. However, these studies were mainly designed to preserve the features of a line for cartography or handwriting recognition applications. There were additional efforts in the design of true type fonts to make use of spline curves to compress the number of points used to display characters. This is explained in more detail in "True type 1.0 font files," a Microsoft technical specification, revision 1.66, 1995, and in "The compact font format specification," Version 1.0, Adobe, 1998, the disclosures of which are incorporated herein by reference. Therefore, while stroke data can be compressed, there is still no way to determine any type of history of the stroke data. There is also no way for a person to view only a coarse representation of the stroke data. Instead, the entire stroke data must be viewed.

Another problem occurs because of the way media is stored. Generally, media is stored in some type of data structure. For instance, digital video is usually stored in a hierarchical data structure, also known as a scene graph. In this format, data elements are stored in nodes, and a hierarchical data structure is similar to a tree in the sense that it starts at a "root" node and continues onward until it ends at "leaf" nodes. Hierarchical data structures are very good for video, because video is normally transmitted by transmitting each frame, starting at the first frame and ending at the last frame. However, if a user wishes to access this frame sequence out of order, then a hierarchical data structure is less advantageous because it is not really designed for this purpose. Moreover, there is no "guide" or "map" that describes what the data in the hierarchical data structure is, where it is, and how it is stored. There is no simple way to access one node of a large hierarchical data structure, without starting at the root node and traversing the graph until the required data is retrieved.

There are other ways to store video and other media. However, these methods have similar problems in that there is currently no techniques for quickly and repeatedly accessing data elements in a currently existing data structure.

Consequently, techniques are needed for determining and transmitting history or coarse representations or both of stroke media and other media, and techniques are needed to be able to quickly and repeatedly access data elements in these media.

SUMMARY OF THE INVENTION

The present invention provides techniques for broadcasting history or coarse representations or both of stroke media and other media. In general, levels are created for media, and the levels are periodically broadcast. The levels segment the media and allow the media to be examined with details that range from coarse to fine or examined with varying importance or both. The periodic broadcast of the levels provides history of the media to any user who wishes to view the history.

In particular, for stroke data, levels of detail are determined through a certain method. Each level of detail is periodically broadcast. The levels of detail may be shown by themselves or combined at a receiver to create segmented views of the stroke data. A user can select a coarse view of the stroke data to quickly see the stroke history.

Additionally, embodiments of the present invention provide techniques for quickly and repeatedly accessing data elements in already existing data structures. Generally, a description is created that describes data elements in a preexisting data structure. One or more links are created, from the description, which allow a user to directly access particular data elements fox the preexisting data structure.

A more complete understanding of the present invention, as well as further features and advantages of the present invention, will be obtained by reference to the following detailed description and drawings.

BRIEF DESCRIPTION OF THE DRAWINGS

FIGS. 8 and 9 are tables used to illustrate examples of two possible broadcasting methods in accordance with two embodiments of the present invention;

FIG. 14 is a definition for a serial mask that describes the serial data structure of FIG. 13, in accordance with one embodiment of the present invention;

FIG. 15 is a definition that contains links to data elements in the serial data structure of FIG. 13, in accordance with one embodiment of the present invention;

FIG. 17 is a definition for an ordered group mask that describes the ordered group data structure of FIG. 16, in accordance with one embodiment of the present invention;

FIG. 18 is a definition that contains links to data elements in the ordered group data structure of FIG. 16, in accordance with one embodiment of the present invention.

DETAILED DESCRIPTION OF PREFERRED EMBODIMENTS

Figure 1:
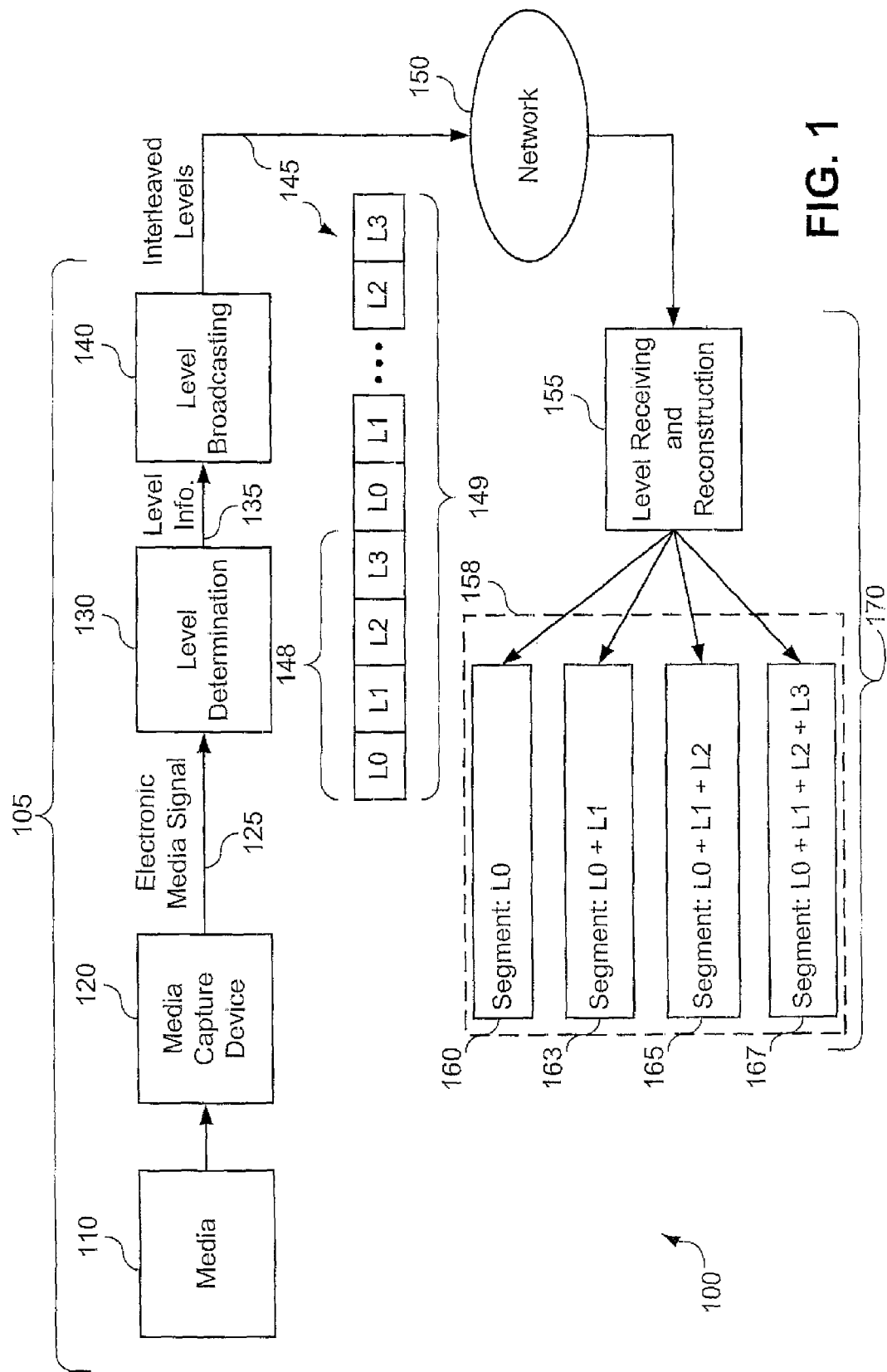
FIG. 1 is a block diagram of a system for transmitting and receiving level of detail information for media, in accordance with one embodiment of the present invention.

Embodiments of the present invention create levels from evolving media. Evolving media is media that comprise history or comprise coarse views of the media. One way to determine coarse views of media is to determine levels of detail or levels of importance in the media. Levels of detail provide a user with mechanisms to view coarse or fine detail of the media. For instance, a coarse level of detail for a video can contain the frames of video that show large scene changes. A user could select a coarse level of detail to view a synopsis of what happened during a certain portion of the movie. Levels of importance are similar to levels of detail. Instead of being based on the amount of detail, however, levels of importance are based on significance. For instance, in seminar media, which is generally made of a series of slides in a presentation, a detailed slide may be considered less significant than another, less detailed slide. The more important slide will be part of a higher level of importance. Similarly for video, the most important scenes of a video, which contain the most significant information useful for a viewer to understand the video, will be contained in a higher level of importance.

A view of multiple levels of detail or importance can contain all of the original detail in the media or contain enough of the detail to be very similar to the original media. Generally, the amount of data that represents each level of detail will monotonically increase because of the increasing detail. Lower levels of detail usually contain less data than do higher levels of detail. For levels of importance, the highest level of importance generally contains less data than does the lowest level of importance.

Periodically broadcasting the levels of detail or importance provides the history to any user who desires it. This can be beneficial, for example, if a user enters a meeting late and would like to see an overview of what transpired in the meeting. It is helpful to determine particular bandwidths for each level of detail or importance, such that certain latency requirements are met. This ensures that remote users can view coarse or fine levels of detail within predetermined periods or certain levels of importance within these periods. It should be noted that even fine levels of detail are "coarse" in the sense that they contain less information than does the original media.

To be able to repeatedly and quickly access a preexisting data structure, techniques are provided that describe the preexisting data structure and that use links, based on the description, to directly access data elements in the data structure. For instance, stroke points that are part of stroke data may be easily, quickly, and repeatedly accessed using these techniques.

The present invention will first be discussed in the context of the periodic broadcasting of evolving media content. Then, the techniques for accessing preexisting data structures, which allows data elements in the evolving media content to be quickly accessed, will be discussed.

Referring now to FIG. 1, this figure shows a system 100 for determining, broadcasting, receiving and displaying evolving media content. System 100 comprises a transmission section 105, a network 150, and a reception section 170. Transmission section 105 comprises media 110, a media capture device 120, a level determination method 130, and a level of detail broadcasting method 140. Reception section 170 comprises a level receiving and reconstruction method 155 and a display 158.

Media 110 is any type of information that can be subsequently captured by a computer system. Media capture device 120 captures the media 110 in a form that can be operated on by a computer system. Generally this form will be a digital signal, but it is possible for computers to work with analog signals. Media capture device 120 converts the media 110 into electronic media signal 125. Electronic media signal 125 is any data from which levels may be created. For instance, if media 110 is a motion picture, media capture device 120 is a device that digitizes the motion picture 110 into pixels and assembles the pixels into frames. The frames are then processed into electronic media signal 125, from which levels may be created. This is discussed in more detail below. If media 110 are strokes on a whiteboard, the strokes are converted by an ink capture device 120 into stroke data 125. Levels may be created from stroke data 125 through methods discussed below.

Level determination method 130 accepts the electronic media signal 125 and creates level information 135. Level information 135 comprises a number of levels. Each level contains an amount of information that is less than the amount of information in electronic media signal 125. For example, with stroke media, electronic media signal 125 will contain a number of points and other information to connect the points. Level information 135 will contain a number of levels of detail for this stroke data. Each level of detail will contain fewer points and yet permit a rendering of an original stroke, and this rendering can vary from crude to fine depending on the levels of detail being examined. As another example, media 110 could be seminar media, such as a slides of a presentation. Media capture device 120 digitally captures each slide to create electronic media signal 125. Electronic media signal 125 is a representation of each slide, and signal 125 could be an image, such as a Graphics Interchange Format (GIF) image, for each slide or the actual file information used to display a slide. Level determination 130 then decides the importance of each slide and level information 135 contains levels of importance. Each level of importance contains one or more slides.

Generally, levels of detail contain monotonically increasing amounts of data as the detail increases. In other words, coarse levels of detail generally contain less data than do fine levels of detail. For levels of importance, more significant levels of importance generally contain less data than do less significant levels of importance. Each level of detail or importance will usually not contain data contained in another level of detail or importance. For instance, Level 0 is the lowest level of detail, and Level 1 would not contain data that exists in Level 0. Creating the levels of detail and importance in this way saves bandwidth. Alternatively, a finer level could include all points from one or more previous levels. For example, Level 3 could contain data from levels Level 2, Level 1 and Level 0.

Level broadcasting method 140 assigns bandwidth to each level and periodically transmits each level to create interleaved levels 145. Interleaving the levels is described in mote detail below. Periodic broadcasting of all the levels allows users to view the history for electronic media signal 125 at any time. Moreover, because there are multiple levels, the user can choose what level or levels to view. In general, Level 0 (L0 in FIG. 1) will contain the smallest amount of data, as it will contain the least detail or most important material; Level 1 (L1 in FIG. 1) will contain more data than Level 0; Level 2(L2 in FIG. 1) will contain more data than Level 1; and Level 3 (L3 in FIG. 1) will contain the most data, as it will contain the most detail or the least important material Level broadcasting method 140 could broadcast all L0 data, followed by L1 data, then by L2 data, and finally by L3 data. However, for large media types, this type of broadcasting scheme means that the Level 0 data, generally the coarsest representation of media 110, will be broadcast infrequently. This means that a user could wait a long time before being able to view Level 0, which can be undesirable.

Consequently, the level broadcasting method 140 is generally assigned a minimum latency during which a level should be broadcast. For example, Level 0 is broadcast every period 148. Period 148 should meet or be smaller than the minimum latency specified for this level. Level 3 will be assigned a minimum latency, which will usually be significantly longer than the latency assigned to Level 0. Period 149 illustrates the period during which Level 3 is broadcast, and period 149 should meet or be smaller than the latency required for Level 3. Because of the data amounts associated with the various levels, Level 0 will generally be broadcast in one period (such as period 148), while higher levels will be broadcast over many such periods.

This means that, after the interleaved levels 145 pass through network 150, level receiving and reconstruction method 155 will reconstruct the various levels for display 158. Method 155 also allows the various levels to be displayed in accordance with the wishes of a user. For instance, FIG. 1 shows four possible scenarios from which a user can choose: segment 160, which comprises L0; segment 163, which comprises levels L0 and L1; segment 165, which comprises levels L0, L1 and L2; and segment 167, which comprises all levels L0, L1, L2 and L3. Thus, a user can choose a very coarse representation, as would be shown by segment 160, of media 110. This is a selection that provides the user with a good overview of the history of media 110. Alternatively, the user can select more detailed representations of media 110, up to and including very detailed representations of the media 110.

It should be noted that, while a user could select a particular set of levels to view, some or all of the levels may not be available at the precise time that the user selects the levels. For instance, a user may select levels L0 and L1 to view. However, level L0 may have just been broadcast and will not be broadcast again until later. Level L1 may be being broadcast, so the level receiving and reconstruction method 155 will show level L1 immediately, but the method 155 will not be able to show level L0 until it is rebroadcast. This example illustrates that it is beneficial to have smaller latencies for less detailed or more important levels, as this allows a user faster access to these significant levels.

Segment 167 may be an exact replica of electronic media signal 125. Alternatively, if errors can be tolerated, segment 167 can be an inexact but close replica of electronic media signal 125. For instance, for stroke data, it is shown below that an inexact replica of stroke data is an excellent representation of the actual stroke data.

Figure 2:
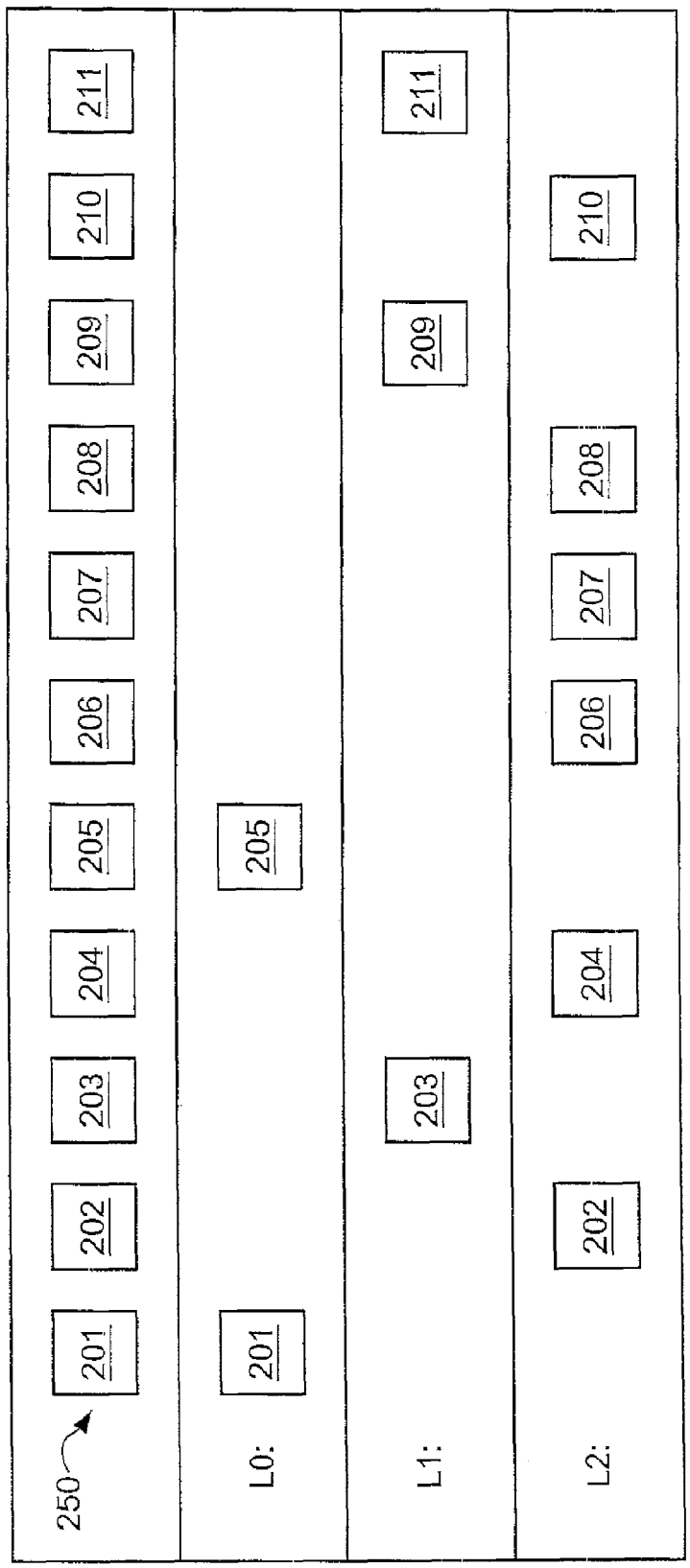
FIGS. 2 and 3 are illustrations of possible level of detail creation for media content, in accordance with two embodiments of the present invention.

Referring now to FIG. 2, this figure shows one technique for creating levels of detail from media content 250. The technique used in FIG. 2 is useful when individual parts of the media content 250 are to be treated as indivisible. Such media content 250 could be sequences of video, slides, ink pages, images, or pages of two- or three-dimensional animation. Media content 250 comprises 11 frames numbered 201 through 211. A frame is a section of media content 250 that is to be treated as indivisible. The coarsest level, L0, contains frames 201 and 205. These frames contain a very coarse level of detail, but should contain enough information to allow a person to determine an overview of the media content 250. Level L1 contains frames 203, 209, and 211. Generally, the amount of data per level of detail increases monotonically with increasing levels. By itself, Level L1 only offers marginally more detail than does Level L0. However, adding the two levels together will create a segment that contains information from both levels of detail Level L2 contains the most detail, and it contains seven frames numbered 202, 204, 206, 207, 208, 210, and 211. For this example, when levels of detail L0, L1, and L2 are combined into a single segment, this segment will contain all of the original information in media content 250.

An example helps to illustrate the usefulness of the technique used in FIG. 2. If frames 210 through 211 are frames of a video, then Level L0 represents a broad overview of the video. For example, the chosen frames for Level L0 could be selected by selecting a frame every time a scene changes. In this small snippet of the video, there are two scene changes. Level L1 contains less substantial changes, such as if a person enters the scene. Level L2 then contains the other frames of the video.

With this system, a viewer can get a synopsis of the video without having to watch the entire movie. Each level of detail can be chosen to select an appropriate amount of detail for the level being determined. For instance, Level L0 could contain important groups of scenes chosen to highlight what occurred in the movie up to the current time (say frame 211) A viewer could then play Level 0 and determine what has happened since the beginning of the movie. Thus, history is transmitted in the technique of FIG. 2 by selecting sets of representative frames for each level of detail.

The levels of detail L0, L1, and L2 are transmitted as shown in FIG. 1, where each level of detail is periodically transmitted to meet a predetermined latency. More detailed levels will have a longer latency. This broadcasting scheme allows a user to have faster access to the coarser levels of detail.

Figure 3:
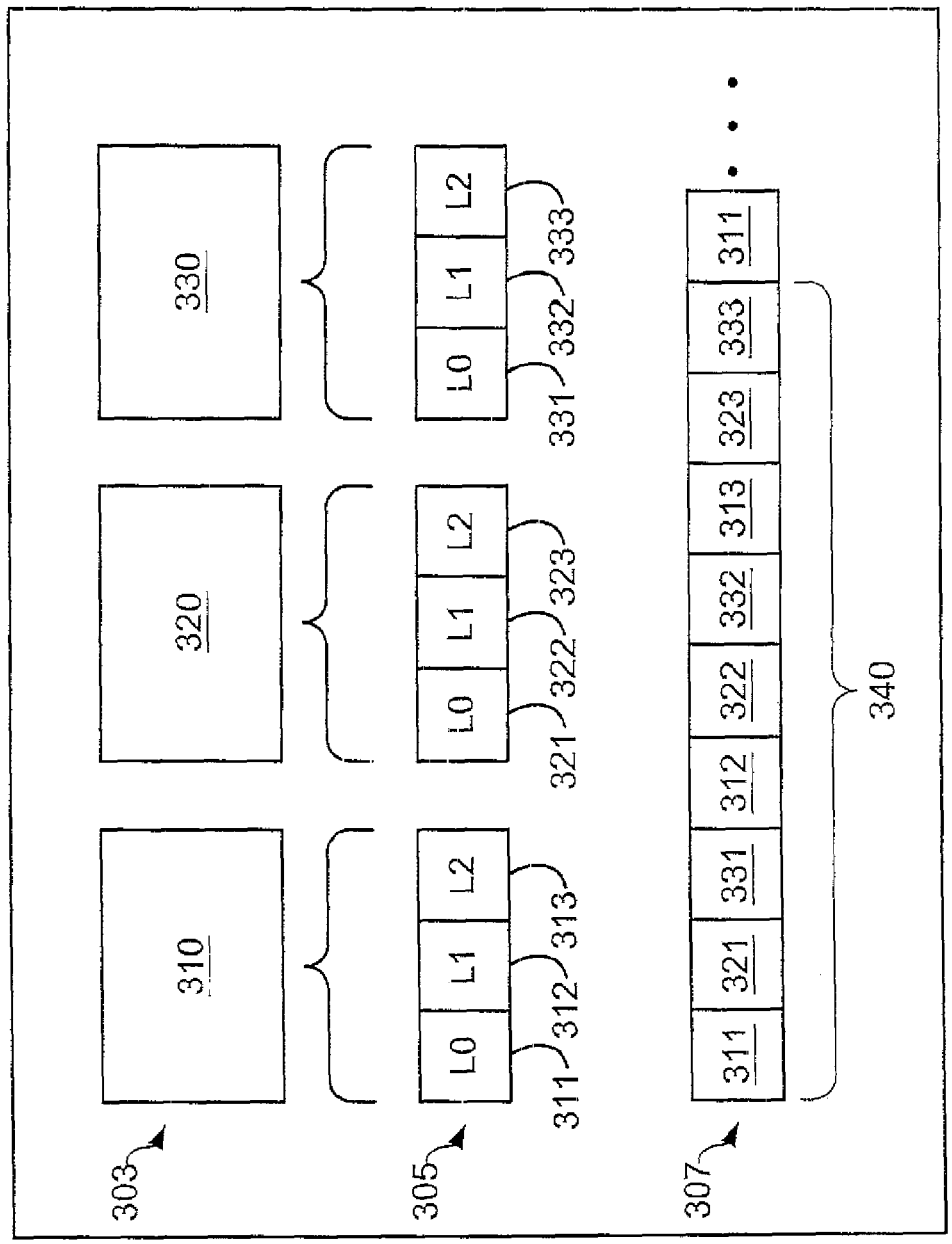

Referring now to FIG. 3, this figure illustrates another technique for creating levels of detail from media content 303. The technique of FIG. 3 is used when frames of the media content 303 are treated as divisible. Media content 303 comprises frames 310, 320, and 330. Each frame is processed into an appropriate level of detail 305. For instance, frame 310 is processed into levels of detail 311, 312, and 313; frame 320 is processed into levels of detail 321, 322, and 323; and frame 330 is processed into levels of detail 331, 332, and 333.

There are various techniques that may be used to process each frame into a level of detail. For the particular case of stroke data, a method is disclosed below that processes the stroke data into multiple levels of detail.

The levels are transmitted as interleaved stream 307, which contains each level of detail from each of the frames 310, 320, and 330. The levels of detail are generally interleaved with the lowest levels of detail having highest priority and the highest levels of detail having lowest priority. In the example of FIG. 2, all of the lowest levels of detail are transmitted first and with the lowest latency. For example, period 340 is a small period that is less than or equal to a small predetermined latency. Levels 312 and 313 will be transmitted at larger periods and larger latencies. It should be noted that there are multiple ways, not shown in FIG. 3 but able to meet latency requirements, to transmit the levels.

The example discussed above in reference to FIG. 2 used video as an illustration of where parts of the media content are treated as non-divisible. However, video is divisible, as evidenced by the Motion Picture Experts Group (MPEG) standards. The technique of FIG. 3 may therefore be applied to this type of media, and to other media such as images, ink pages, slides, and animation. However, the history created by the technique of FIG. 3 is not ideal for viewing low detail levels of detail in video, as a reason for the levels of detail is to provide a quick synopsis of the video. Partial frames of video may not provide the overview sought. Consequently, the technique of FIG. 2 works better on video because it provides an appropriate snapshot of the video, yet also provides the full information per frame of media content.

Figure 4:
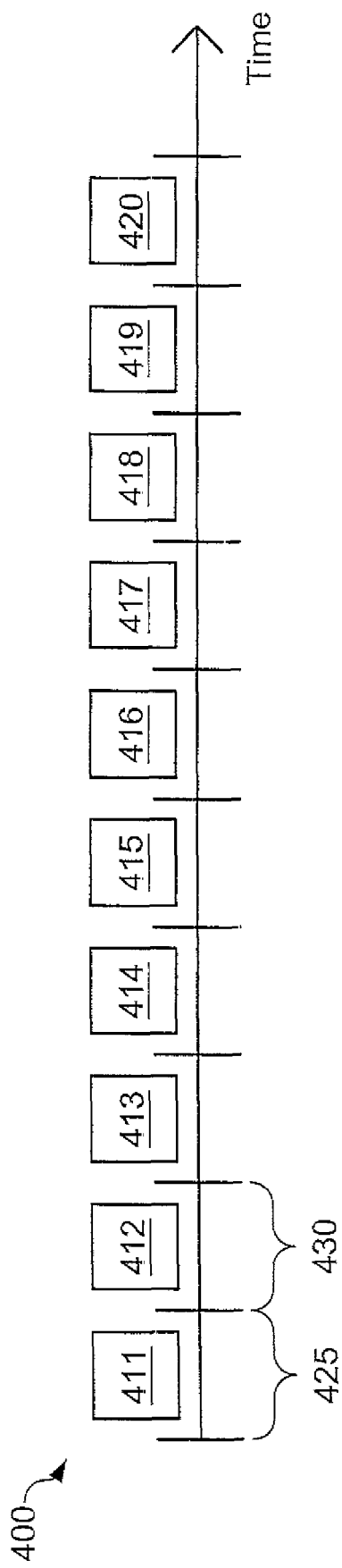
FIG. 4 is an illustration of a possible level of importance creation for media content, in accordance with one embodiment of the present invention.

Referring now to FIG. 4, this figure illustrates a set 400 of seminar slides. FIG. 4 is used to illustrate an embodiment where the level of importance is used, instead of levels of detail, to partition media. Set 400 of seminar slides comprises slides 411 through 420. These slides are presented in order from slide 411 to slide 420. The time period during which each slide is presented may not be uniform. For example, time of presentation 425 may be smaller than time of presentation 430, or vice versa Generally, the importance of each slide 411 through 420 will be determined by when it was presented. The slide that was presented last is the most important slide. In the example of FIG. 4, slide 420 is the most important slide while slide 411 is the least important slide. Consequently, slide 420 will be broadcast as Level 0, slide 419 will be broadcast as Level 1, and so on, until slide 411 is broadcast as Level 9. These would be broadcast per one of the methods described in FIGS. 2 or 3. For example, Level 0 would be assigned the lowest latency and would be broadcast periodically so that a user has the fastest access to this level. Other levels would have higher latencies. In particular, Level 9, which contains slide 411, would have the highest latency. In this manner, a user would be able to view the most important slides first.

Alternatively, a user could assign importance to each slide. This would allow a system to determine which slides belong to which level of importance. In this embodiment, Level 0, the level with the most important information, could comprise slides that a user marks as most important. For example, a user could mark slides 413 and 418 as most important, and these would be added to Level 0. If slide 420 is marked as least important, then this slide would be assigned to a level having less important slides. This type of systems gives a user more control over how the set 400 of slides is broadcast.

Thus, FIGS. 2, 3, and 4 provide flexible schemes for creating history from media content, and they can be adapted or even combined based on the media content.

Figure 5:
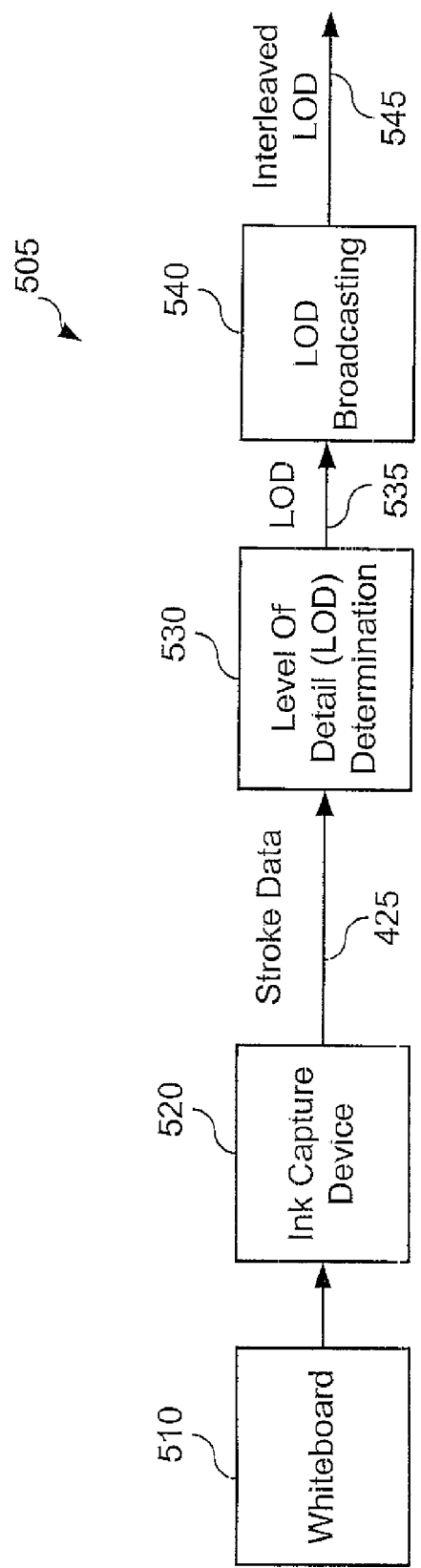
FIG. 5 is a block diagram of a transmission system for broadcasting level of detail for stroke media, in accordance with one embodiment of the present invention.

Referring now to FIG. 5, a block diagram is shown of a transmission system 505 for creating and broadcasting levels of detail from whiteboard media. Transmission system 505 is similar to the transmission system 105 of FIG. 1, only transmission system 505 is specifically designed for whiteboard media. Transmission system 505 comprises a whiteboard 510, an ink capture device 520, a level of detail determination method 530, and a level of detail broadcasting method 540.

Ink capture device 520 determines stroke data 525 from whiteboard 510. The content of a whiteboard is made up of strokes written by users. A stroke is defined as a continuous curve created when the pen or Personal Computer (PC) mouse is down on the whiteboard and ends when the pen or PC mouse is lifted up from the whiteboard. These strokes are captured and rendered as a sequence of points by ink capture device 520. For a typical whiteboard stroke-capturing device, the entities that make up a stroke are temporally sampled point coordinates. The stroke is then tendered on the display as a curve that passes through those sampled points. The simplest tendering of the stroke is thus connecting subsequent sampled points with straight lines.

In the rest of this discussion, the content of a whiteboard is viewed as a collection of strokes, each of which is composed of a sequence of temporally sampled points (referred as stroke data points) connected by straight lines. Traditionally, stroke media are considered static and not viewed as a streaming media type. However, to work with stroke data in a real-time collaborative environment, it has to be made streamable to sustain the collaboration over a network. A streaming mechanism is especially essential in low bandwidth environments (e g., regular telephone modem) to reduce the download waiting time and enhance the media quality. Even in high bandwidth environments (e.g., local area networks, cable modem or asynchronous digital subscriber line) a streaming technology has been shown to be essential to the data with delays and latency incurred from transmitting large amount of data.

The level of detail determination method 530 determines levels of detail 535 through a method to be discussed below. The level of detail broadcasting method 540 transmits the levels of detail by interleaving the levels of detail to create interleaved level of detail 545. In most cases, the interleaving and transmitting is performed so that predetermined latencies are met for each of the levels of detail. The level of detail broadcasting method 540 will take steps known to those skilled in the art to transmit the interleaved levels of detail 545 over whatever network is being used. For example, a wireless or wired network using the Transmission Control Protocol/Internet Protocol could be used and level of detail broadcasting method 540 will package the interleaved levels into appropriate packets.

Now that the transmission system 505 has been described, a method for determining levels of detail 535 from stroke data 525 will be described, followed by a method for broadcasting the levels of detail.

The rate of stroke data points generated from every ink capture device (also commonly called a stroke capture device) is about the same order. Without loss of generality, the file size of the stroke data 525 can be estimated of stroke data generated by typical device on a regular 4 feet by 6 feet of whiteboard. A typical device generates 60-120 stroke data points per second (assume 100 stroke data points per second). Assume that every stroke will take on average 1 second and there are 1000 strokes in the whiteboard (assume 1 hour of high usage). There are 100,000 (100K) stroke data points in total. Without counting the overhead for common attributes (such as color, width, and time stamp) associated with each stroke, each stroke data point requires two dimensional coordinates. Each coordinate uses 2 bytes. The whiteboard ends up with a total of 400K bytes of data.

For some applications, it is important to record the time stamp of the stroke data points. For instance, whole collaborative whiteboard sessions can be recorded and replayed in their dynamic form allowing the users to see how a design happened, not just the final static image of the whiteboard. Each time stamp uses 4 bytes, without considering possible compression. It will account for 400K additional bytes of data for the above example. As a result, a whiteboard can end up with a total of 800K bytes of data. When the whiteboard area is completely filled, every stroke data can be stored in a page and users start to write on a new page. Note that it is possible to produce a large number of whiteboard pages during a long or intensive conference session. Consequently, the resulting file size could be very large.

The level of detail determination method 530 creates levels of detail from stroke data 525. The levels of detail may be thought of as one way to compress the data representation that make up a whiteboard. When discussing levels of detail, it is beneficial to be able to compare a level of detail with the original stroke media. Thus as a first step, a quantitative performance measurement is defined for the content of the whiteboard as it differs from the original content. This analysis is performed using the base unit of a stroke. As described above, the original stroke is composed of a sequence of densely sampled points connected by straight lines. When the original stroke is approximated by a sequence of sparse points also connected by straight lines, an approximation error will occur. The compressed sparse set of points connected by straight lines is referred to as the predicted stroke.

The quantitative error performance measurement discussed herein is based on the bounding area between the original stroke and the predicted stroke. To calculate this bounding area between the two curves, the correspondence between each point in the sparse point list of the predicted stroke with the points in the dense point list of the original stroke has to be found. The sequential point list of the original stroke is defined as $P_i=(x_i,y_i)$ where $1 \leq i \leq N$ and N is the number of points in the original stroke. The sequential point list of the predicted stroke is defined as $\tilde{P}_i=(\tilde{x}_i,\tilde{y}_i)$ where $1 \leq i \leq M$ and M is the number of points in the predicted stroke. After the correspondence between the original and predicted strokes is determined, the error is calculated as the sum of the triangular areas defined by the coordinates of the two sequential point lists.

Figure 6:
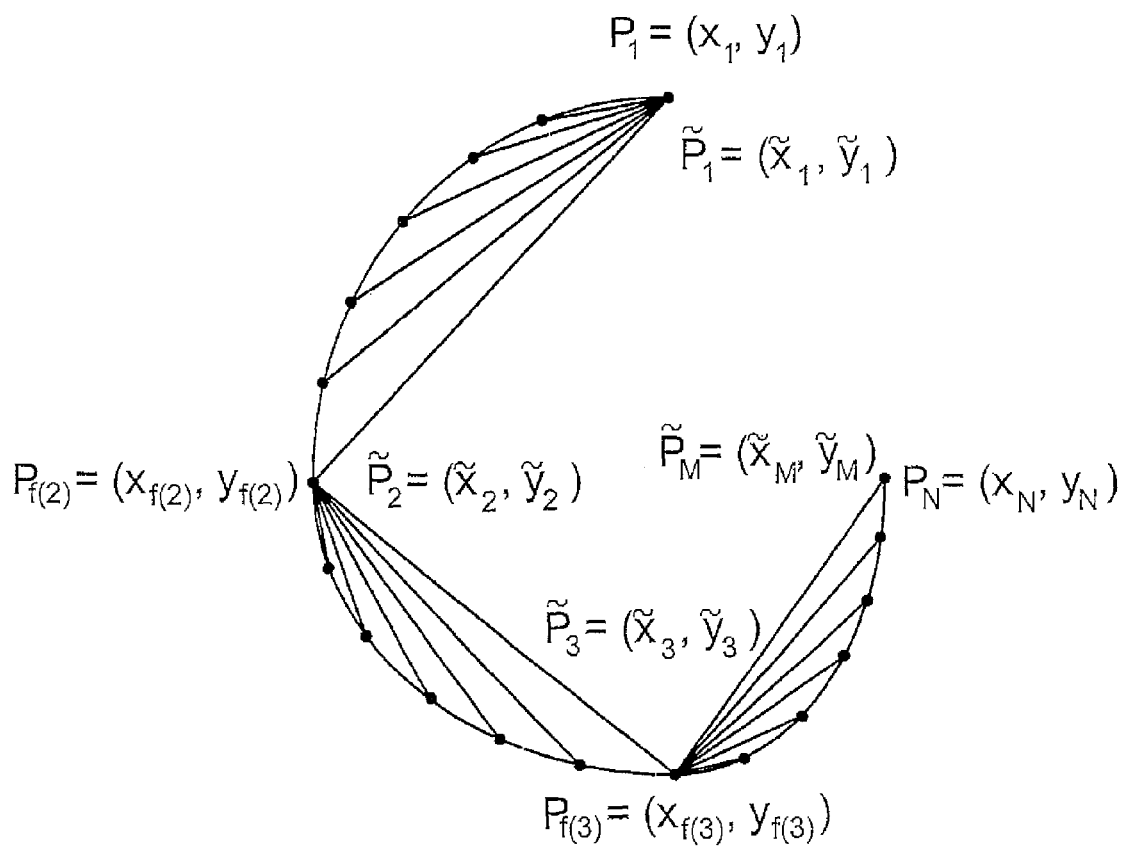
FIG. 6 is a stroke used to illustrate a method to determine levels of detail for stroke data, in accordance with one embodiment of the present invention.

FIG. 6 shows an original stroke $\{P_i=(x_i,y_i)|1 \leq i \leq N\}$ and a predicted stroke $\{\tilde{P}_i=(\tilde{x}_i,\tilde{y}_i)|1 \leq i \leq M\}$, where two assumptions were made to simplify the error calculation. First, the first endpoints are assumed to be the same, $P_1=\tilde{P}_1$, and the last endpoints are assumed to be the same, $P_N=\tilde{P}_M$. Second, assume that the correspondence between each point in the predicted stroke and some point in the original stroke is identical, $P_{f(i)}=\tilde{P}_i$, where point i of the predicted stroke identically corresponds to point f(i) of the original stroke. With these assumptions, the error quantity is calculated by adding up the triangular areas in FIG. 6.

Having defined an area-based error performance measurement between an original stroke and a predicted stroke, each stroke is next cut up into logical segments such that the error can be analytically calculated. A stroke can be segmented in any number of ways, but the following two criteria result in a defined procedure for a stroke segmentation process. The first criterion is to segment a stroke such that any intersection within one stroke segment is eliminated. The second criterion is to guarantee that, when the error is calculated, the resulting areas have an additive property within one stroke segment. With these two criteria, a segmentation procedure is obtained.

The first criterion requires that the segmentation be performed such that all curve intersections are eliminated from each stroke segment. This criterion can be satisfied by segmenting the stroke at every stroke data point where there is either a local vertical minimum or a local horizontal maximum. In order to balance the vertical extreme segmentations, the horizontal extreme segmentations are added. Therefore, the stroke is segmented at every local vertical minimum, vertical maximum, horizontal minimum, and horizontal maximum.

The second criterion requires that the segmentation be performed such that the error calculation for each stroke segment has the additive property. This criterion is easier to satisfy once that the first criterion segmentation is performed. Given that the strokes are already segmented at their local extremes, it suffices to prevent combinations of concavity and convexity within a stroke segment in which the curvature switches polarity. This can be detected by searching for points of inflection. As a result, the stroke is segmented at every inflection point.

In order to compress the original strokes without degrading the final stroke rendering, the error performance between the original strokes and the compressed strokes should be minimized. The error performance of the compressed stroke is defined as the area bounded by the curves of the original stroke and the compressed stroke. Minimizing the error performance is equivalent to getting the two curves to overlap as close as possible. In the present error minimization solution, an iterative procedure is used to find the data points of the prediction stroke.

Referring again to FIG. 6, given an original stroke, defined as $\{P_i=(x_i,y_i)|1 \leq i \leq N\}$ where $P_1$ and $P_N$ are endpoints of the stroke, the first task is to find one prediction point $\tilde{P}$ such that the predicted stroke, consisting of three points $\{P_1, \tilde{P}, P_N\}$, minimizes the stroke error performance. One constraint is that the prediction point $\tilde{P}$ will be chosen such that $\tilde{P}$ is one of the points on the original stroke, $\tilde{P} \in \{P_i=(x_i,y_i) | 1 \leq i \leq N\}$. This constraint allows for preservation of the original point data and results in the original stroke sequence when bandwidth is sufficient. To find the optimal prediction point $\tilde{P}$, the definition of error performance is again examined in the following paragraph.

The error performance between the original stroke, $\{P_i=(x_i,y_i) | 1 \leq i \leq N\}$, and the predicted stroke, $\{P_1, \tilde{P}, P_N\}$, can be calculated as the sum of triangular areas formed by these data points, which is the additive property of the error measurement. Let $Area_\Delta(P_i, P_j, P_k)$ denote the area of the triangle formed by vertices $P_i$, $P_j$ and $P_k$. With the constraint that the prediction point $\tilde{P}$ is one of the original points, the error performance E between the original stroke and the predicted stroke is expressed as:

$$E(J) = \sum_{i=3}^{J} Area_\Delta(P_1, P_{i-1}, P_i) + \sum_{i=J+1}^{N-1} Area_\Delta(P_{i-1}, P_i, P_N)$$

where the error performance E is a function of the selected prediction point:

$$\tilde{P}=P_J \in \{P_i | 1 < i < N\}$$

To find the prediction point $P_J$ which minimizes the error performance, the error equation is split as follows:

$$E(J)=F(J)+G(J)$$

where $$F(J) = \sum_{i=3}^{J} Area_\Delta(P_1, P_{i-1}, P_i)$$

$$G(J) = \sum_{i=J+1}^{N-1} Area_\Delta(P_{i-1}, P_i, P_N)$$

It then follows that:

$$F(i)=F(i-1)+Area_\Delta(P_1, P_{i-1}, P_i)$$

$$G(i)=G(i-1)-Area_\Delta(P_{i-1}, P_i, P_N)$$

There is a local minimum at point $P_J$ if and only if:

$$E(J-1) \geq E(J) \leq E(J+1)$$

For the left inequality, $$E(J-1) \geq E(J)$$

$$F(J-1)+G(J-1) \geq F(J)+G(J)$$

$$F(J)-Area_\Delta(P_1, P_{J-1}, P_J)+G(J)+Area_\Delta(P_{J-1}, P_J, P_N) \geq F(J)+G(J)$$

$$Area_\Delta(P_{J-1}, P_J, P_N) \geq Area_\Delta(P_1, P_{J-1}, P_J)$$

For the right inequality, $$E(J) \leq E(J+1)$$

$$F(J)+G(J) \leq F(J+1)+G(J+1)$$

$$F(J)+G(J) \leq F(J)+Area_\Delta(P_1, P_J, P_{J+1})+G(J)-Area_\Delta(P_J, P_{J+1}, P_N)$$

$$Area_\Delta(P_J, P_{J+1}, P_N) \leq Area_\Delta(P_1, P_J, P_{J+1})$$

Therefore the prediction point $P_J$, which locally minimizes the error performance, has been found if:

$$Area_\Delta(P_{J-1}, P_J, P_N) \geq Area_\Delta(P_1, P_{J-1}, P_J)$$

$$Area_\Delta(P_J, P_{J+1}, P_N) < Area_\Delta(P_1, P_J, P_{J+1})$$

The areas of the triangle can be calculated by taking the magnitude of the cross products of the vectors formed by the vertices of the triangle. Consequently, $$Area_\Delta(P_1, P_{i-1}, P_i) = \|<x_{i-1}-x_1, y_{i-1}-y_1> \times <x_i-x_1, y_i-y_1>\|$$

$$Area_{66}(P_1, P_{i-1}, P_i) = \|x_{i-1}y_i - x_iy_{i-1} - x_i(y_i - y_{i-1}) + y_1(x_i - x_{i-1})\|$$

and $$Area_\Delta(P_{i-1}, P_i, P_N) = \|<x_{i-1}-x_N, y_{i-1}-y_N> \times <x_i-x_N, y_i-y_N>\|$$

$$Area_\Delta(P_{i-1}, P_i, P_N) = \|x_{i-1}y_i - x_iy_{i-1} - x_N(y_i - y_{i-1}) + y_N(x_i - x_{i-1})\|$$

One pass for $P_i$ where $i \in (1,N)$ will determine one prediction point $\tilde{P}=P_J$ for the original stroke $\{P_i | 1 \leq i \leq N\}$. This prediction point optimally bisects the stroke into two segments. The two smaller segments of the stroke are henceforward referred to as substrokes. Afterwards, the error minimization pass is repeated for the two substrokes, and the next set of prediction points are calculated. This procedure is repeated recursively until every point is predicted or until a maximum error threshold is satisfied. In an embodiment of the present invention, a level of detail is assigned to correspond to the number of error minimizing iterations performed. Therefore, the first level of detail refers to finding the first prediction point on a stroke. The second level of detail refers to finding the next two prediction points on the two substrokes. The third level of detail refers to finding the next four prediction points on the four substrokes, and so on.

There are multiple benefits of creating and broadcasting levels of detail. One benefit of having levels of details is to provide for different bandwidth capabilities. For broadcasts of whiteboard content, the stroke data is transmitted to a heterogeneous set of users. In order to satisfy every user, the stroke data is divided into different levels of details. Almost all whiteboard content can be divided into three types of stroke data. The first type is called segmentation points, which includes the endpoints and the segmentation points. The second type is named feature points, which are calculated from the error minimization prediction points. Finally, the third type is designated as the non-feature points, which include those points not identified by the error minimization procedure For the base level of detail, denoted Level 0, the data is comprised of these sets of segmentation points. In the content of a whiteboard, the segmentation points include (1) the beginning and final endpoints of each stroke, (2) the horizontal and vertical extreme segmentation points, and (3) possible inflection points on the stroke. Therefore, there is a minimum of two segmentation points on each stroke. And as the stroke becomes longer and more complicated, each local minimum and maximum extreme point is detected and added to the set of segmentation points. As a result, these segmentation points represent a very coarse view of each stroke.

For all subsequent levels of detail, the feature and non-feature points are selected based on the error minimization procedure that has been previously described. Before this task can be performed, one of three design criteria should be selected. The first criterion sets the number of error minimization iterations to perform. The second criterion sets the maximum error threshold to allow. The third criterion is a combination of these two criteria which sets the maximum number of iterations and the maximum error threshold. The number of error minimization procedure is performed up to the specified iterations and the resulting prediction points are included in the data set only if the error is still above the maximum preset threshold. The third criterion is beneficial, as it provides flexibility for a user to adjust the threshold for each level.

For the next level of detail, denoted Level 1, the data is comprised of the first set of feature points. These feature points are calculated after the Level 0 segmentation points are derived. The segmentation points of each stroke divide the stroke into several smaller substrokes. On each substroke, the error is calculated and tested to see if it is below the maximum error threshold. If the substroke has already met the test, the next substroke is considered. Otherwise, one iteration of the error minimization procedure is performed to obtain one optimal prediction point. This set of first iteration prediction points gives the Level 1 data. If the design criterion for Level 1 is that the number of iterations equals one, then Level 1 is finished. On the other hand, if the number of iterations desired is two, then another iteration of error minimization is performed to obtain another set of prediction points, and these second iteration prediction points are included in the Level 1 data.

There can be subsequent levels of detail that follow in the same manner, where the data is comprised of future sets of feature points. After the desired number of levels is determined, the very last level of detail is comprised of the non-feature points These are all the points on the whole whiteboard that were not selected to belong to any of the previous levels. This final level is denoted herein as Level L.

Figure 7:
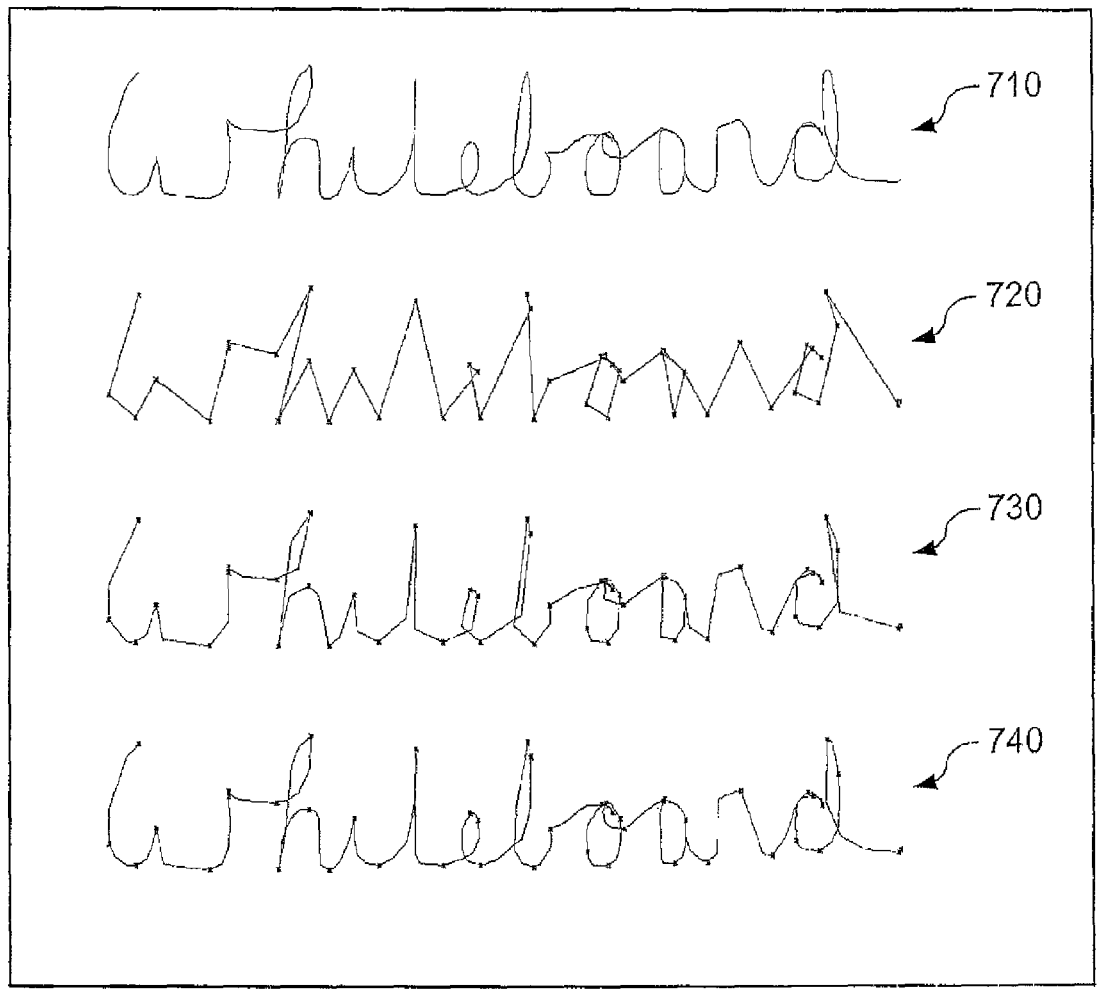
FIG. 7 shows an original stroke and three segments, each comprising at least one level of detail, in accordance with one embodiment of the present invention.

The error minimization procedure for a stroke finds the optimal stroke points and groups them into the appropriate levels of detail. In one embodiment, Level 1 simply captures those points which were detected by the first iteration of the error minimization process and Level 2 captures those points which were detected by the second iteration of the error minimization process. FIG. 7 shows an original whiteboard stroke 710, a Level 0 stroke 720, both Level 0+Level 1 strokes 730, and the Level 0+Level 1+Level 2 strokes 740, each of which is based on this embodiment. The total number of points captured for the original stroke is 1181. As shown in the figure, the number of data points in strokes 720, 730 and 740 is 48, 95, and 184, respectively, and corresponds to an error performance measure of 47472, 12806, and 4019, respectively. It can be seen that two levels of error minimization prediction are sufficient for a reconstruction with almost no visual distortion.

The levels of detail awe ordered in terms of when they are created and in sequence of their detail priority, i.e., Level 0, Level 1, Level 2, Level 3, . . . Level (L−1), Level (L), for a total of L+1 levels. Level 0 represents the coarsest level of detail and gives a visually rough estimate of the whiteboard content, and thus is given the highest priority. Level 1 then adds the most significant set of feature points, followed by Level 2, Level 3, . . . , Level (L−2). The Level (L−1) is then composed of the finest details that may not even be visually significant to the whiteboard. The final level, Level L, contains all the remaining stroke data points (non-feature points) that have not been selected into any previous Level, and thus is given the lowest priority.

These levels have an inherent priority ordering as well as, in general, increasing data size. The sequential ordering of the levels of detail is used to determine their progressive streaming, or broadcasting, schedule. Higher priority levels of detail should be streamed out first with lower levels following. A server can decide in real-time when and how many levels of detail it will send to the particular client based on certain specifications, such as the delay time, media quality requirement, bandwidth, and server resource utilization.

Even though servers can decide how and when to broadcast the levels of detail, generalized bandwidth allocation and streaming schedules are now proposed as examples of a possible broadcasting method. This method is based on the data size for each level of detail. For this method, for Level i, denote $n_i$ to be the size of the data points in Level i. Then, for a fixed broadcast bandwidth, let $t_i$ be the amount of time it takes to transmit data of size $n_i$. Assume there are a total of L levels of detail to be transmitted from Level 0 to Level (L−1). Note that Level L, which comprises the non-feature points, are not transmitted here. It follows that all the levels of details can be transmitted in a total time T, where $T=t_0+t_1+t_2+\ldots+t_{L-1}$. This also translates to transmitting every level of detail once every T period. However, because the levels of detail have an inherent priority ordering, it may be preferable to transmit Level 0 more often than the other levels of detail, and Level (L−1) less frequently than the others. For instance, if it is desired that the lower levels of detail be quickly available to a user, such that the user has almost instant access to these levels of detail, then broadcasting the lower levels of detail more frequently than the higher levels of detail is recommended.

To support this recommendation, the higher priority levels are assigned a larger bandwidth allocation than is strictly necessary to transmit the levels. Initially assume every level of detail has equal priority. It follows that Level i data is transmitted once every T period, thus $f_i=t_i/T$ represents the fraction of bandwidth allocated to Level i. Then by definition, $f_0+f_1+f_2+\ldots+f_{L-1}=1$. In the general case, the sizes of the level of detail tend to be monotonically increasing, such that $n_0 \leq n_1 \leq n_2 \leq \ldots \leq n_{L-1}$, due to the binary iterations of the error minimization procedure. Consequently, the transmission times are also monotonically increasing, such that $t_0 \leq t_1 \leq t_2 \leq \ldots \leq t_{L-1}$, and thus the fraction of bandwidth allocations are also monotonically increasing, such that $f_0 \leq f_1 \leq f_2 \leq \ldots \leq f_{L-1}$. This demonstrates that even though that the lower levels of detail have the same priority as the higher levels of detail, the lower levels occupy a smaller portion of the bandwidth because of their smaller size.

In this general case, one straightforward option is to assign equal bandwidth allocation for each of the levels of detail, such that $F_0=F_1=F_2=\ldots=F_{L-1}=1/i$, where $F_i$ is the fraction of total bandwidth allocated to Level i. This suggests that the data for Level i are transmitted at a period of $T_i=t_i/F_i=Lt_i$. The resulting transmission period is thus monotonically increasing, $T_0 \leq T_1 \leq T_2 \leq \ldots \leq T_{L-1}$, meaning that the lower levels of detail are transmitted more often than the higher levels. This is desirable, since the lower levels have the higher priorities and these levels are repeated more often in the available bandwidth.

FIG. 8 contains a table that corresponds to an example having four levels of detail where the data size is monotonically increasing. In this example, equal bandwidth allocation is assigned for each level of detail, such that the lower levels of detail are transmitted more often. The receiver is guaranteed to receive Level 0 and Level 1 after a maximum latency of 200 milliseconds (ms), which is much better than the one second latency if every level of detail is transmitted once each turn.

FIG. 8 therefore illustrates one generalized solution to the problem of bandwidth allocation based on monotonically increasing data size and monotonically lower priority for each level of detail. The solution given in FIG. 8 is to allocate equal bandwidth for each level of detail. This solution can accommodate various design constraints. For example, the transmission latency requirement is specified and the bandwidth fraction is calculated as $F_i=t_i/T_i$. One constraint being that the sum of bandwidth fractions can not be more than one, i.e., $F_0+F_1+F_2+ \ldots +F_{L-1} \leq 1$. Thus, an answer is to allocate the bandwidth fractions such that this inequality is not violated.

There are other possible solutions to the problem of the previous paragraph. Taking the example from FIG. 8, assume a design requires that both Level 0 and Level 1 must have a maximum latency of only 80 ms. Furthermore, all levels of detail must be received within a 7 second delay. FIG. 9 contains a table of this design. It can be seen that in order to satisfy $F_0+F_1+F_2+ \ldots +F_{L-1} \leq 1$, the allocated bandwidth fraction for Level 2 must be $F_2 \leq \frac{1}{4}$. Consequently, a transmission period of $T_2=640$ ms is satisfactory.

Although the broadcasting schemes described above have specifically referred to stroke data, these are applicable to any media type. For instance, Level 0 for a film will generally comprise a number of important frames of the film. These frames can be periodically broadcast as described above. This will allow a user to quickly view a synopsis of the film by viewing Level 0 information.

Now that the periodic broadcasting of evolving media content has been discussed, techniques for quickly accessing evolving media content will now be discussed. Media is generally stored in some type of data structure. A problem with these data structures is that there are generally few ways to directly access data elements within the media. For example, stroke data is generally stored as a series of points, and retrieving the series of points that make up the stroke is relatively easy. Because this is the method by which stroke data is generally accessed, the data structures for stroke data are designed to facilitate this access. However, with the present invention, specific points within the stroke data must be repetitively accessed. Searching through a series of points just to retrieve a single point can be slow.

Consequently, the present invention discloses techniques to speed access to specific data that are stored in a preexisting data structure. Generally, the present invention defines a data structure description that describes the data elements in the data structure. The data structure description contains nomenclature for the data elements, possible sequences of different elements, structural aspects for the data elements, and types for data elements. These are described in more detail below. Additionally, the present invention defines, by using the data structure description, a number of links, each of the links locating one or more data elements in the data structure. With this technique, data elements in a data structure may be quickly, easily, and repetitively accessed.

The following discussion focuses on three different data structures: hierarchical data structures (also called "graphs"); serial data structures; and order group data structures. However, the techniques presented here may be used for other types of data structures.

Figures 10, 11:
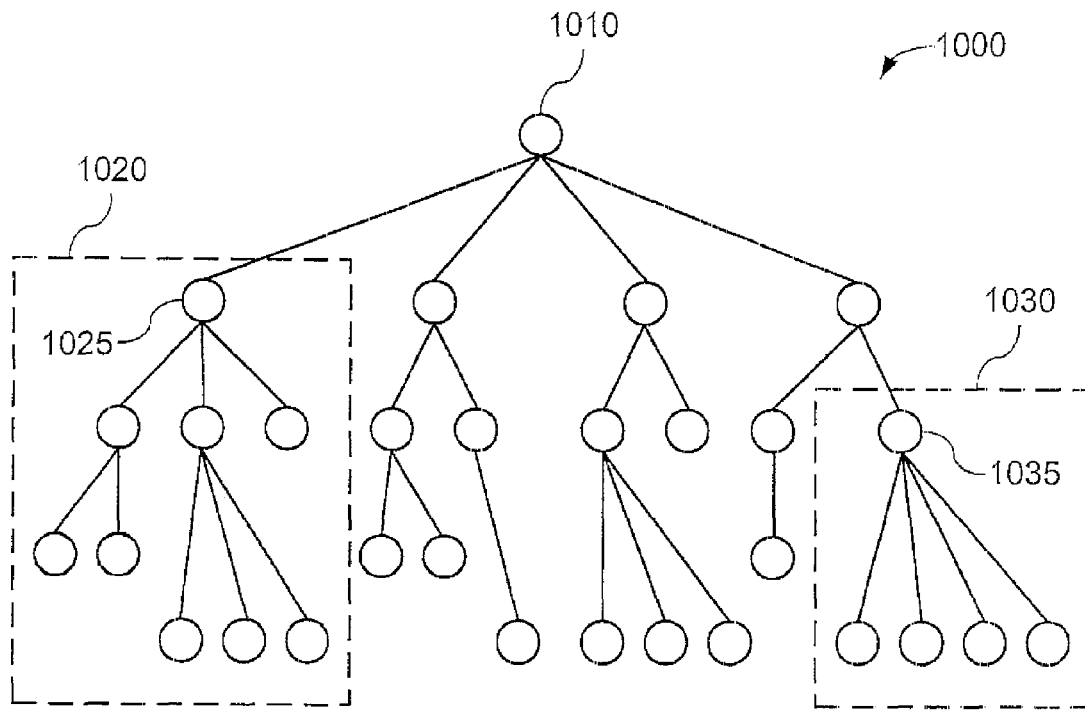
FIG. 10 is a diagram of a graph data structure, in accordance with one embodiment of the present invention.
FIG. 11 is a definition for a graph mask that describes the graph data structure of FIG. 10, in accordance with one embodiment of the present invention.

Turning now to FIG. 10, a graph 1000 is shown Graph 1000 is a hierarchical data structure comprised of a number of nodes, of which node 1010, node 1025, and node 1035 are labeled. Node position is recorded and is used to access particular nodes. For instance, node 1025 has node position 1 and node 1030 has node position 10. Node 1025 is the toot node of subgraph 1020. This means that any of the eight nodes underneath it can be reached by first accessing node 1025. Similarly, node 1035 is a loot node of subgraph 1030, and any of the four nodes underneath node 1035 can be accessed by first accessing node 1035.

It is possible to define a data structure description that generally describes graph 1000. This data structure definition can then be used to create links that allow access directly to data elements in graph 1000.

Referring now to FIG. 11, a data structure description is shown that generically describes graph 1000 and its data elements. The data structure description is shown in eXtensible Markup Language (XML). The "SceneGraphMask D" describes non-overlapping subgraphs in a scene graph or hierarchical graph data structure.

Semantics of the SceneGraphMaskType are as follows:

| Name | Definition |
| --- | --- |
| SceneGraphMaskType | Describes a collection of non-overlapping subgraphs in a scene graph or hierarchical graph data structure. |
| SubGraph | Indicates a subgraph in the scene graph mask by pointing at the root node of the subgraph or hierarchical graph data structure. |

Figures 12, 13:
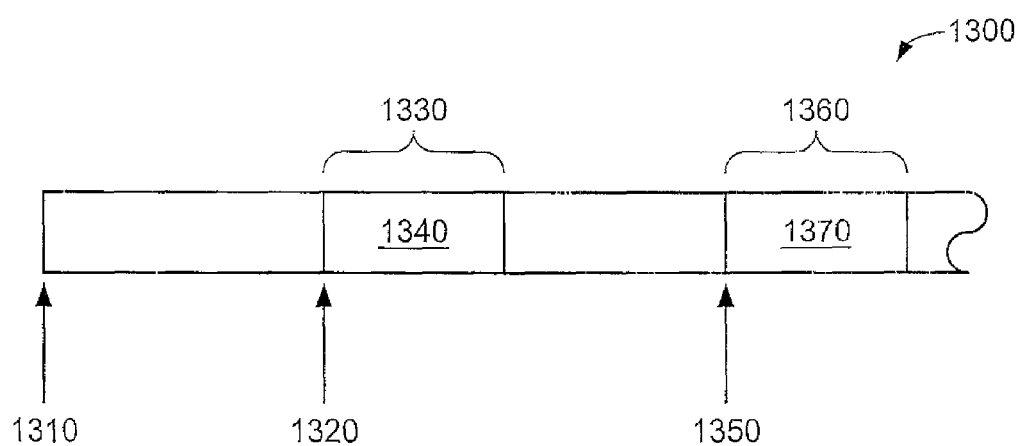
FIG. 12 is a definition that contains links to data elements in the graph data structure of FIG. 10, in accordance with one embodiment of the present invention.
FIG. 13 is a diagram of a serial data structure, in accordance with one embodiment of the present invention.

An example of using the data structure description to create links to individual data elements in a graph is shown in FIG. 12. Two links are shown in FIG. 12 In the first link, NodeId1 links to node 1 (node 1025 of FIG. 10) of graph 1000 of FIG. 10. This allows access to subgraph 1020 The second link, NodeId10, links to node 10 (node 1035 of FIG. 10) of graph 1000 of FIG. 10. This allows access to subgraph 1030.

Turning now to FIG. 13, a serial data structure 1300 is shown. In serial data structure 1300, data is serially stored from origin 1310 to an end of the data structure (not shown in FIG. 13). Access to the data is through bit access, where the start of a data element is known, relative to origin 1310, and the length of the data element is also known. In the example of FIG. 13, data element 1340 is accessed by using byte offset 1320 and length 1330. Similarly, data element 1370 is accessed by using byte offset 1350 and length 1360. Each byte offset is a number indicating the amount of bytes from the origin 1310. As is known in the art, offsets can be described in numerous ways, of which bytes is only one possible description.

Referring now to FIG. 14, a data structure description is shown that generically describes serial data structure 1300 and its data elements. The data structure description is shown in XML. The "MediaSpaceMask D" describes non-overlapping binary and text data subintervals in a file.

The semantics of the MediaSpaceMaskType follows.

| Name | Definition |
| --- | --- |
| MediaSpaceMaskType | Describes a collection of non-overlapping data subintervals in a file. |
| SubInterval | Describes a subinterval of data in a file using the byte offset and byte length information. If only the byte offset is specified, the interval is "open-ended," i.e., the end of the subinterval corresponds to the end of the file. |

-continued

| Name | Definition |
| --- | --- |
| ByteOffset | Specifies the byte offset of the subinterval, i.e., the number of bytes to be skipped from the beginning of the file in order to reach the start of the subinterval. The byte offset value applies to the file in a format that is apparent from the content. |
| Length | Specifies the length of the interval in number of bytes. |

The "MediaSpaceMask D" describes non-overlapping subintervals of data by pointing to the locations of the physical bytes in a file. An advantage of this is that it points to the data directly without parsing the content structure. However, if the data of an object has been scattered in the file (due to the compression algorithms or interleaving with other media), this would result in a very inefficient representation. The "MediaSpaceMask D" comprises a set of ByteOffset and Length elements. This mask is useful in locating the content described by a sequential data format, such as various ink files, text files, Motion Picture Experts Group, fourth standard (MPEG4) files, or Virtual Reality Modeling Language (VRML) files.

The example in FIG. 15 illustrates the use of the "MediaSpaceMask D" for creating two links. These two links describe the two subintervals 1340, 1370 in the file 1300 of FIG. 13. The links are used to access the data in the subintervals 1340, 1370.

Figure 16:
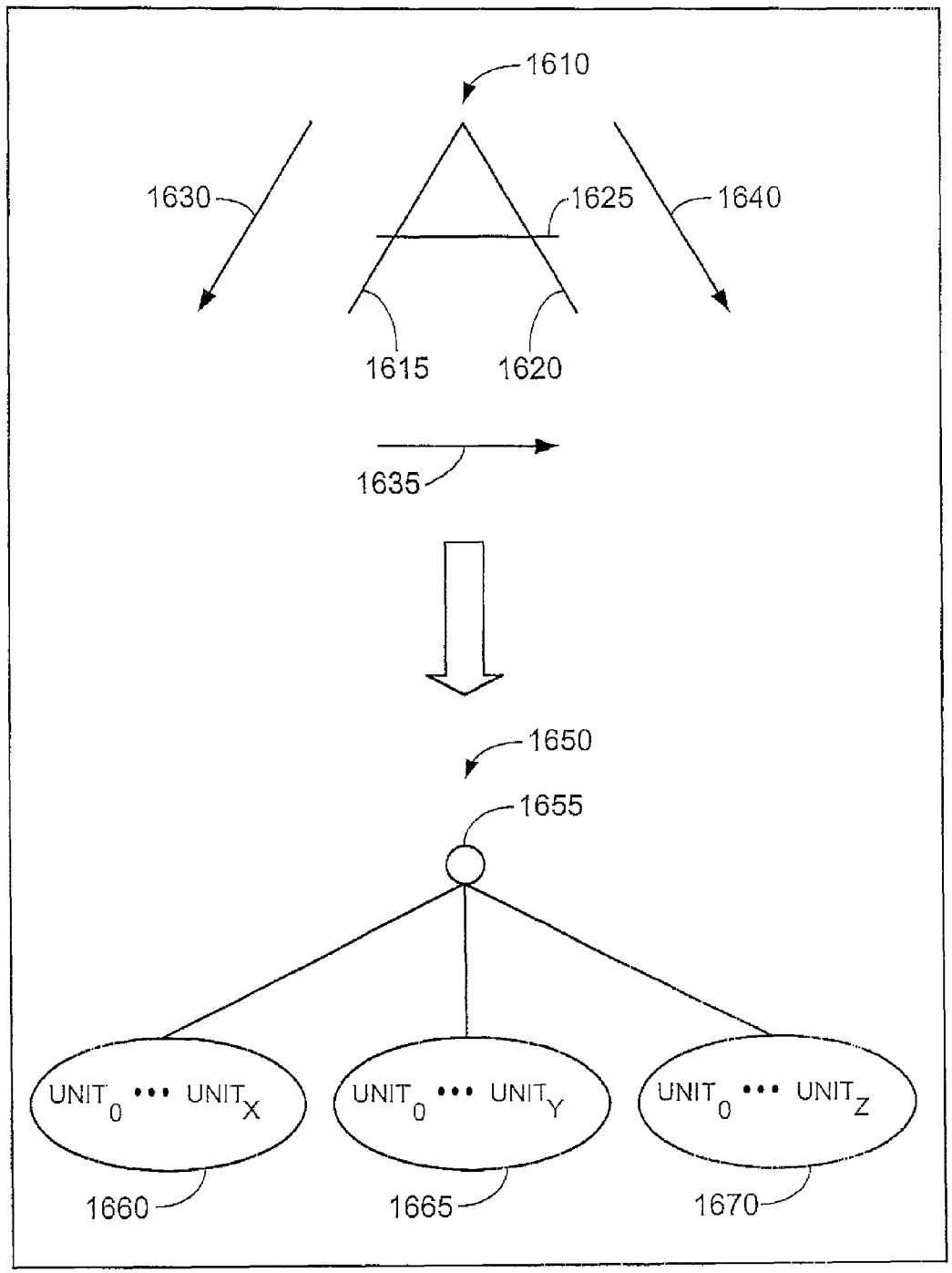
FIG. 16 is a diagram of an ordered group data structure, in accordance with one embodiment of the present invention.

Referring now to FIG. 16, this figure shows an ordered group data structure 1650 and an ink letter 1610 from which the ordered group data structure 1650 is created. Ink letter 1610 comprises three strokes 1615, 1620, and 1625. These strokes were written in the following older: stroke 1615 first was written first; then stroke 1620 was written; and finally stroke 1625 was written. The manner of writing each stroke is indicated in the following way: stroke 1615 was written as indicated by sequence 1630; stroke 1620 was written as indicated by sequence 1640; and stroke 1635 was written as indicated by sequence 1635. Each sequence indicates how data points are entered into an ink capture device.

One can make use of the older of writing each stroke and its sequence of points by creating an ordered group data structure. Ordered group data structure 1650 contains a setName node 1655, which is an identification in the structure 1650, and this setName node 1655 is linked to character 1610.

Ordered group data structure 1650 comprises three components 1660, 1665, and 1670. Component 1660 is linked to stroke 1615, including its data points written in sequence 1630 Component 1665 is similarly linked to stroke 1620, including its data points written in sequence 1640. Finally, component 1670 is linked to stroke 1625, including its data points written in sequence 1640. $Unit_0$ through $Unit_x$ of component 1660 correspond to the data points of stroke 1615, written in sequence 1630. $Unit_0$ through $Unit_y$ of component 1665 correspond to the data points of stroke 1620, written in sequence 1640. Finally, $Unit_0$ through $Unit_z$ of component 1670 correspond to the data points of stroke 1625, written in sequence 1635. Ordered group data structure 1650 therefore allows relatively fast access to data points of a stroke for this character.

Turning now to FIG. 17, a data structure description is shown that generically describes the ordered group data structure 1650 and its data elements. The data structure description is shown in XML. The "OrderedGroupDataSetMask D" describes non-overlapping subsets or subintervals in an ordered group dataset.

The semantics of the OrderedGroupDataSetMaskType are as follows:

| Name | Definition |
| --- | --- |
| OrderedGroupDataSetMaskType | Describes non-overlapping subsets or subintervals in an ordered group dataset. |
| SubInterval | Describes a subinterval in an ordered group datataset. A single subinterval cannot go across sets. |
| SetName | References to the set (or subgraph) where the subinterval is defined and from where the units and components are chosen (optional). |
| StartComponent | Indicates the number of the beginning component in the sub-interval. |
| StartUnit | Indicates the number of the starting unit of the beginning component in the sub-interval (optional). If absent, it indicates the first unit in the beginning component. |
| EndComponent | Indicates the number of the end component in the sub-interval. |
| EndUnit | Indicates the number of the end unit of the end component in the sub-interval (optional). If absent, it indicates the last unit in the end component. |

The OrderedGroupDataSetMask D defines a collection of non-overlapping subsets or sub-intervals in an ordered group dataset. It is useful in the cases that content can be organized in an ordered grouping internal data structure, such as ink content and MPEG4/VRML scene graph. The number of components and units may start at zero in every set. For example, ink content can be easily organized into an ordered grouping data structure. For another instance, MPEG4/VRML scene graph has defined its depth first, then left to right rendering sequence. This tendering sequence naturally defines all of its leaf.

Turning now to FIG. 18, an example is shown that uses the description in FIG. 17 in order to create links to individual points of stokes in character 1610, as shown in FIG. 16, or to entire strokes of the character 1610. The SetName link allows a character to be quickly accessed, while the StartComponent/EndComponent and StartUnit/End unit allow strokes and data points, respectively to be easily accessed.

Thus, the examples of FIGS. 10 through 18 show that, by describing how a data structure is constructed, and creating links to data elements within the structure, data elements can be quickly, easily, and repeatedly accessed. It should be noted that one or more of the data structures of FIGS. 10, 13, and 16 may be combined. In this instance, a single data structure description may be used to describe the combined data structure. This description can then be used to create links to data elements in the data structure. Alternatively, multiple data structure descriptions may be used to describe the individual sections of the combined data structure, and each of the data descriptions may be used to create links to data elements within the part of the data structure described by the data description.

Figure 19:
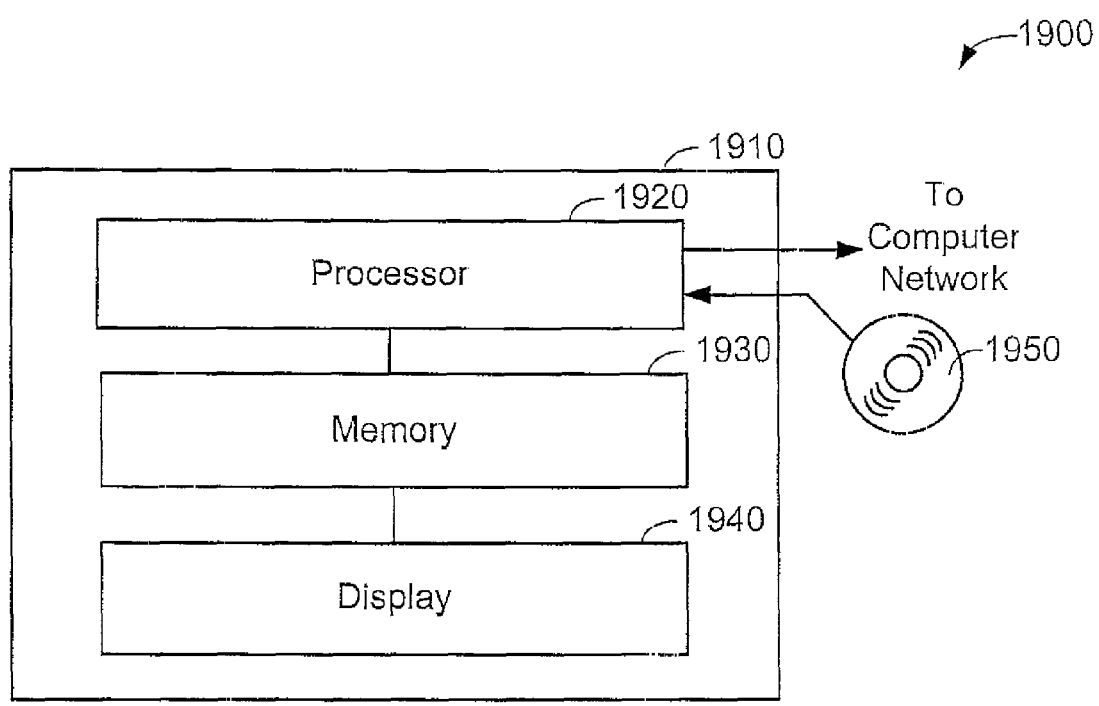
FIG. 19 is a block diagram of an exemplary computer system suitable for carrying out embodiments of the present invention.

Referring now to FIG. 19, a block diagram of a system 1900 is shown for periodically broadcasting and/or locating evolving media content System 1900 comprises a computer system 1910 and a Compact Disk (CD) 1950. Computer system 1910 comprises a processor 1920, a memory 1930 and a video display 1940.

As is known in the art, the methods and apparatus discussed herein may be distributed as an article of manufacture that itself comprises a computer-readable medium having computer-readable code means embodied thereon. The computer-readable code means is operable, in conjunction with a computer system such as computer system 1910, to carry out all or some of the steps to perform the methods or create the apparatuses discussed herein. The computer-readable medium may be a recordable medium (e g., floppy disks, hard drives, compact disks, or memory cards) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as compact disk 1950.

Memory 1930 configures the processor 1920 to implement the methods, steps, and functions disclosed herein. The memory 1930 could be distributed or local and the processor 1920 could be distributed or singular. The memory 1930 could be implemented as an electrical, magnetic or optical memory, or any combination of these of other types of storage devices. Moreover, the term "memory" should be construed broadly enough to encompass any information able to be read from or written to an address in the addressable space accessed by processor 1910. With this definition, information on a network is still within memory 1930 because the processor 1920 can retrieve the information from the network. It should be noted that each distributed processor that makes up processor 1920 generally contains its own addressable memory space. It should also be noted that some or all of computer system 1910 can be incorporated into an application-specific or general-use integrated circuit.

Video display 1940 is any type of video display suitable for interacting with a human user of system 1900. Generally, video display 1940 is a computer monitor or other similar video display.

It is to be understood that the embodiments and variations shown and described herein are merely illustrative of the principles of this invention and that various modifications may be implemented by those skilled in the art without departing from the scope and spirit of the invention.

What is claimed is:

1. A method for periodically broadcasting media content, the method comprising the steps of:
   creating a plurality of levels for the media content, wherein each of said plurality of levels has a distinct amount of information representing an encoding of said media content;
   determining a predetermined latency for each level; and
   periodically transmitting each level, wherein said periodically transmitting comprises transmitting each level with a corresponding predetermined latency.

2. The method of claim 1, wherein the step of creating a plurality of levels for the media content comprises creating two levels for the media content.

3. The method of claim 1, wherein:
   the step of creating further comprises the step of creating a plurality of levels of detail; and
   the step of periodically transmitting further comprises the step of periodically transmitting each level of detail.

4. The method of claim 1, wherein:
   the step of creating further comprises the step of creating a plurality of levels of importance; and
   the step of periodically transmitting further comprises the step of periodically transmitting each level of importance.

5. The method of claim 1, wherein the step of creating further comprises the step of creating a plurality of levels wherein no level contains information from the media content that is in another level.

6. The method of claim 1, wherein each level comprises an amount of data that is less than an amount of data in the media content.

7. The method of claim 1, wherein combining data from all of the levels provides an exact representation of the media content.

8. The method of claim 1, wherein combining data from all of the levels does not provide an exact representation of the media content.

9. The method of claim 1, wherein the media content comprises one or more of stroke data, video, audio, text, images, a slide sequence, a three-dimensional sequence, and an animation.

10. The method of claim 1, wherein one of the levels has less data than another level, and wherein the method further comprises the step of assigning a higher bandwidth to the one level than is assigned to the other level.

11. The method of claim 1, wherein one of the levels is more important than another level, and wherein the method further comprises the step of assigning a higher bandwidth to the one level than is assigned to the other level.

12. The method of claim 1, further comprising the steps of:
    assigning a minimum latency for each of the levels; and
    determining a bandwidth for each level of detail by using a corresponding one of the minimum latencies.

13. The method of claim 1, wherein the step of periodically transmitting each level further comprises the step of interleaving the levels.

14. The method of claim 1, wherein:
    the media content comprises a plurality of indivisible units;
    the step of creating further comprises selecting some of the indivisible units for each level; and the step of periodically transmitting further comprises the step of interleaving each of the levels into an output stream.

15. The method of claim 1, wherein:
the media content comprises a plurality of divisible units;
the step of creating further comprises processing each divisible unit into a plurality of levels; and
the step of periodically transmitting further comprises the step of interleaving levels from each divisible unit into an output stream.

16. The method of claim 15, wherein each of the divisible units comprises stroke data determined from a whiteboard at a certain time.

17. The method of claim 1, further comprising the steps of:
receiving each of the levels; and
displaying some of the levels through the following steps:
selecting some of the plurality of levels to display; and
reconstructing part or all of the media content by combining the selected levels.

18. A system for periodically broadcasting media content, comprising:
a memory that stores computer-readable code; and
a processor operatively coupled to the memory, the processor configured to implement the computer-readable code, the computer-readable code configured to:
create a plurality of levels for the media content, wherein each of said plurality of levels has a distinct amount of information representing an encoding of said media content;
determine a predetermined latency for each level; and
periodically transmit each level, wherein said periodically transmitting comprises transmitting each level within a corresponding predetermined latency.

19. The system of claim 18, wherein:
the computer-readable code is further configured, when creating, to create a plurality of levels of detail; and
the computer-readable code is further configured, when periodically transmitting, to periodically transmit each level of detail.

20. The system of claim 18, wherein:
the computer-readable code is further configured, when creating, to create a plurality of levels of importance; and
the computer-readable code is further configured, when periodically transmitting, to periodically transmit each level of importance.

21. The system of claim 18, wherein the media content comprises one or more of stroke data, video, audio, text, images, a slide sequence, a three-dimensional sequence, and an animation.

22. The system of claim 18, wherein one of the levels has less data than another level, and wherein the computer-readable code is further configured to assign a higher bandwidth to the one level than is assigned to the other level.

23. The system of claim 18, wherein one of the levels is more important than another level, and wherein the computer-readable code is further configured to assign a higher bandwidth to the one level than is assigned to the other level.

24. An article of manufacture comprising:
a non-transitory computer-readable medium having computer-readable code means embodied thereon, the computer-readable program code means comprising:
a step to create a plurality of levels for the media content, wherein each of said plurality of levels has a distinct amount of information representing an encoding of said media content;
a step to determine a predetermined latency for each level; and
a step to periodically transmit each level, wherein said periodically transmitting comprises transmitting each level within a corresponding predetermined latency.

* * * * *